United States Patent [19]
Beck et al.

[11] Patent Number: 5,151,516
[45] Date of Patent: Sep. 29, 1992

[54] POLYMERIZABLE PERYLENE-3,4,9,10-TETRACARBIMIDES

[75] Inventors: Karin H. Beck, Ludwigshafen; Karl-Heinz Etzbach, Frankenthal, all of Fed. Rep. of Germany; Hans-Werner Schmidt, Goleta, Calif.

[73] Assignee: BASF Aktiengesellschaft, Ludwigshafen, Fed. Rep. of Germany

[21] Appl. No.: 598,004

[22] Filed: Oct. 12, 1990

[30] Foreign Application Priority Data

Oct. 13, 1989 [DE] Fed. Rep. of Germany ....... 3934329

[51] Int. Cl.$^5$ .......................................... C07D 221/22
[52] U.S. Cl. ..................................................... 546/37
[58] Field of Search .......................................... 546/37

[56] References Cited

U.S. PATENT DOCUMENTS 4,358,391 11/1982 Finkelmann et al. ............. 252/299.6
4,379,934 4/1983 Graser et al. ......................... 546/37
4,446,324 5/1984 Graser .................................. 546/37
4,667,036 5/1987 Oden et al. .......................... 546/37
4,702,945 10/1987 Etzbach et al. ..................... 428/1
4,845,223 7/1989 Seybold et al. ...................... 546/37

OTHER PUBLICATIONS

Makromol. Chem., Rapid Commun. 7, 1986, pp. 71-76, G. W. Gray, et al., "Preparation of Liquid Crystalline Polysiloxanes with Terminal Cyano Groups in the Side Chains".
Makromol, Chem. 188, pp. 1355-1366, 1987, H. Ringsdorf, et al., "Synthesis and Characterization of Liquid-Crystalline Copolymers with Dichroic Dyes and Mesogens as Side Groups".

Primary Examiner—C. Warren Ivy
Assistant Examiner—Amelia A. Owens
Attorney, Agent, or Firm—Oblon, Spivak, McClelland, Maier & Neustadt

[57] ABSTRACT

Perylimides useful as monomers have the formula

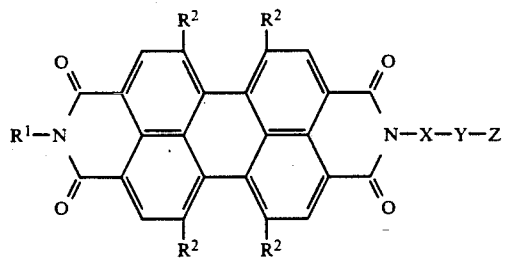

wherein
$R^1$ is $C_1$–$C_{20}$-alkyl which may be interrupted by one or more oxygen atoms or is substituted phenyl,
$R^2$ has the meanings hydrogen, chlorine or substituted or unsubstituted phenoxy independently of one another in its four appearances,
X is a chemical bond or a radical of the formula

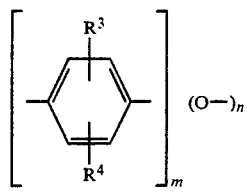

where $R^3$ and $R^4$ are each independently of the other hydrogen, $C_1$–$C_4$-alkyl, $C_1$–$C_4$-alkoxy or halogen m is 1 or 2, and n is 0 or 1,
Y is $C_6$–$C_{14}$-alkylene which may be interrupted by one or more oxygen atoms or by one or more imino or $C_1$–$C_4$-alkylimino groups, and
Z is vinyl, acryloyloxy or acryloxylamino.

3 Claims, No Drawings

POLYMERIZABLE PERYLENE-3,4,9,10-TETRACARBIMIDES

The present invention relates to novel peryleneimides of the formula I

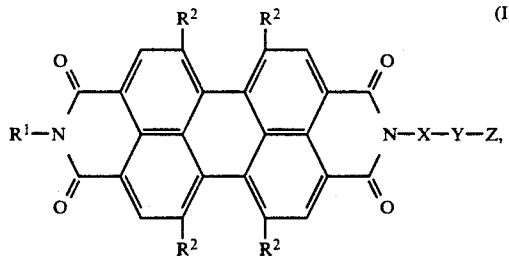

where
- $R^1$ is $C_1$–$C_{20}$-alkyl, which may be interrupted by one or more oxygen atoms, or is phenyl which is monosubstituted or polysubstituted by $C_1$–$C_{13}$-alkyl or $C_1$–$C_{13}$-alkoxy,
- $R^2$ is identical or different at each of its appearances, each appearance of $R^2$ being independently of the others hydrogen, chlorine, phenoxy or halogen-, $C_1$–$C_4$-alkyl- or $C_1$–$C_4$-alkoxy-substituted phenoxy,
- X is a chemical bond or a radical of the formula

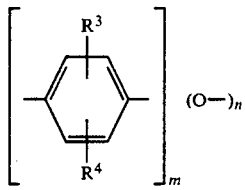

where $R^3$ and $R^4$ are identical or different and each is independently of the other hydrogen, $C_1$–$C_4$-alkyl, $C_1$–$C_4$-alkoxy or halogen, m is 1 or 2 and n is 0 or 1,
- Y is $C_6$–$C_{24}$-alkylene which may be interrupted by one or more oxygen atoms or by one or more imino or $C_1$–$C_4$-alkylimino groups, and
- Z is vinyl or a radical of the formula W-CO-C($R^5$)=$CH_2$, where $R^5$ is hydrogen, methyl or chlorine and W is oxygen, imino or $C_1$–$C_4$-alkylimino, to the use thereof as monomers for preparing polymers, and to polymers which contain the novel perylene compounds as monomer units.

Polymerizable perylene-3,4,9,10-tetracarbimides are known and described for example in U.S. Pat. No. 4,667,036. The spacer mentioned therein (as counterpart to the radical Y of the formula I) is $C_2$–$C_4$-alkylene. However, it has been found that these perylene compounds have inadequate application properties.

There are also polymers having liquid crystalline properties where the moieties responsible for the mesophase are attached as side chains to a polymer main chain via flexible spacers.

Suitable polymer main chains are for example polyacrylates, polymethacrylates (DE-A-2,722,589) and polysiloxanes (EP-A-29,162).

Copolymers having mesogenic groups and dye moieties in the side chain are described for example in EP-A-90,282 and EP-A-260,687.

It is an object of the present invention to provide novel perylimide based dye monomers which polymerize readily; that is, whose polymerization should ideally not be hindered by for example inhibition or steric factors. In addition, the polymerized dyes should be very temperature and light stable, be highly dichroic and if used as a building block in liquid crystalline polymers should ideally not affect the properties of the liquid crystal matrix, eg. the clear point, the phase behavior, the viscosity or the formation of homogeneously planar or homeotropic textures We have found that this object is achieved by the perylimides of the formula I defined at the beginning.

The alkyl or alkylene appearing in the components according to the present invention may be either straight-chain or branched.

If the components according to the present invention contain radicals which are interrupted by one or more oxygen atoms or imino or $C_1$–$C_4$-alkylimino groups, preference is given to those radicals which are interrupted by from 1 to 3, preferably by 1 or 2, oxygen atoms or imino or $C_1$–$C_4$-alkylimino groups.

$R^3$ and $R^4$ are each for example methoxy, ethoxy, propoxy, isopropoxy, butoxy, isobutoxy, sec-butoxy, fluorine, chlorine or bromine W is for example methylimino, ethylimino, propylimino, isopropylimino or butylimino.

$R^3$ and $R^4$ may each also be for example, like $R^1$, methyl, ethyl, propyl, isopropyl, butyl, isobutyl or sec-butyl.

$R^1$ may also be for example pentyl, isopentyl, neopentyl, tert-pentyl, hexyl, 2-methylpentyl, heptyl, 1-ethylpentyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl, eicosyl (the above names isooctyl, isononyl, isodecyl and isotridecyl are trivial names derived from oxo process alcohols—cf. Ullmann's Encyklopëdie der technischen Chemie, 4th edition, Volume 7, pages 215 to 217, and Volume 11, pages 435 and 436.), 2-propoxyethyl, 2-isopropoxyethyl, 2-butoxyethyl, 2- or 3-methoxypropyl, 2- or 3-ethoxypropyl, 2- or 3-propoxypropyl, 2- or 3-isopropoxypropyl, 2- or 3-butoxypropyl, 2- or 3-(2-ethylhexyloxy)propyl, 2- or 4-methoxybutyl, 2- or 4-ethoxybutyl, 2- or 4-propoxybutyl, 2- or 4-isopropoxybutyl, 2- or 4-butoxybutyl, 2- or 4-(2-ethylhexyloxy)butyl, 2-methyl-6-isopropylphenyl, 2-methyl-6-sec-butylpheny1,2-methyl-6-tert-butylphenyl2-ethyl-6-isopropylphenyl, 2-ethyl-6-sec-butylphenyl, 2-ethyl-6-tert-butylphenyl, 2-methylphenyl, 2,3-, 2,4-2,5- or 2,6-dimethylphenyl, 2,4,6-trimethylphenyl, 2-methyl-4-methoxyphenyl, 2,5-dimethyl-4-methoxyphenyl, 2-ethylphenyl, 2,6-diethylphenyl, 2,6-diethyl-4-methylphenyl, 2-isopropylphenyl, 2,4-, 2,5- or 2,6-diisopropylphenyl, 2-n-butylphenyl, 2-sec-butylphenyl, 2-n-pentylphenyl, 2-n-hexylphenyl, 2-(2-methylpentyl)phenyl, 2-n-octylphenyl, 2-methoxyphenyl, 2-ethoxyphenyl, 2,5-dimethoxyphenyl, 2,5-diethoxyphenyl, 2,4-dimethoxyphenyl, 2,4-diethoxyphenyl, 2,3-dimethoxyphenyl or 2,3-diethoxyphenyl.

$R^2$ is for example 2-, 3- or 4-fluorophenoxy, 2-, 3- or 4-chlorophenoxy, 2-, 3- or 4-bromophenoxy, 2-, 3- or 4-tert-butylphenoxy, 2-isopropyl-4-methylphenoxy, 2,3-, 2,4-, 2,5- or 2,6-dichlorophenoxy, 2,4,5- or 2,4,6-trichlorophenoxy, 2-, 3- or 4-methylphenoxy, 2,3-, 2,4-, 2,5-, 2,6- or 3,5-dimethylphenoxy, 2,5,6-trimethylphenoxy, 2-methyl-4-chlorophenoxy, 2-methyl-5-chlorophenoxy, 2-methyl-6-chlorophenoxy, 2-ethylphenoxy, 2,6-diethylphenoxy, 2,6-diethyl-4-methylphenoxy,2-isopropylphenoxy, 3-methyl-4-chlorophenyl, 4-propylphenoxy, 4-butylphenoxy, 2-, 3- or 4-methoxyphenoxy, 2-, 3- or 4-ethoxyphenoxy, 2-, 3- or 4-propoxyphenoxy, 2-, 3- or 4-isopropoxyphenoxy, 2-, 3- or 4-butoxyphenoxy or 2,4-dimethoxyphenoxy.

Preference is given to perylimides of the formula I where $R^1$ is $C_1$-$C_{10}$-alkyl or $C_1$-$C_4$-alkyl- or $C_1$-$C_4$-alkoxy-monosubstituted, -disubstituted or -trisubstituted phenyl, $R^2$ is at each appearance independently of the other appearances hydrogen, phenoxy or chlorine, X is a chemical bond, phenylene or phenyleneoxy, Y is $C_6$-$C_{13}$-alkylene, and Z is vinyl or a radical of the formula—O—CO—C($R^5$=CH$_2$, where $R^5$ is hydrogen or methyl.

The perylimides of the formula I according to the present invention are prepared in a conventional manner. For instance, a perylene compound of the formula II

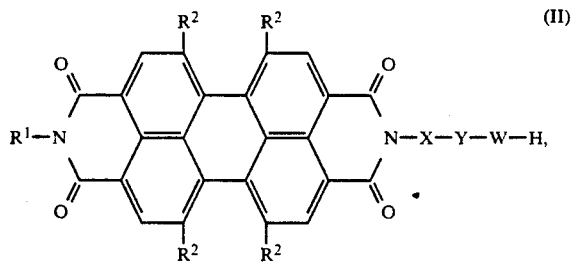

where $R^1$, $R^2$, W, X and Y are each as defined above, can be reacted with an acryloyl halide of the formula III $CH_2$=$CH(R^5)$—CO—Hal    (III), where $R^5$ is as defined above and Hal is halogen (eg. chlorine or bromine), in an inert organic diluent, eg. dioxane, tetrahydrofuran, N,N-dimethylformamide, N-methylpyrrolidinone or methylene chloride, in the presence of a base, eg. triethylamine or pyridine.

When Z is vinyl, it is advantageous to react a perylene derivative of the formula IV

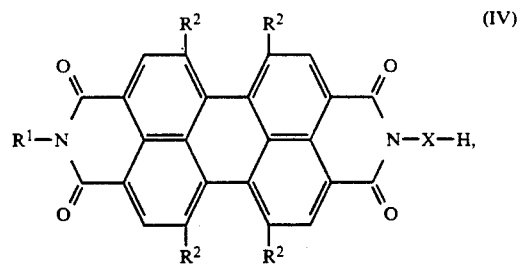

where $R^1$, $R^2$ and X are each as defined above with an alkenyl halide of the formula V Hal—Y—CH=CH$_2$    (V),

where Hal is halogen (eg. chlorine or bromine) and Y is as defined above, in an inert organic diluent, eg. N,N-dimethylformamide, N-methylpyrrolidinone or dimethyl sulfoxide, in the presence of a base, eg. sodium carbonate, potassium carbonate, sodium bicarbonate or potassium bicarbonate.

The starting perylene components II and IV are known per se and described for example in DE-A-2,451,782, U.S. Pat. Nos. b 4,379,934, 4,446,324 and EP-A-227,980 or can be obtained by the methods mentioned therein If $R^2$ is substituted or unsubstituted phenoxy, the dyes may also be prepared from the corresponding chlorine compounds of the formula I ($R^2$=chlorine) by reaction with substituted or unsubstituted phenols in the presence of a base.

The novel perylimides of the formula I are advantageously suitable for use as monomers for preparing polymers which contain monomer units based on the perylimides of the formula I in copolymerized form.

The present invention accordingly further provides perylimide polymers where the characteristic monomer units are the radicals of the formulae VI and VII

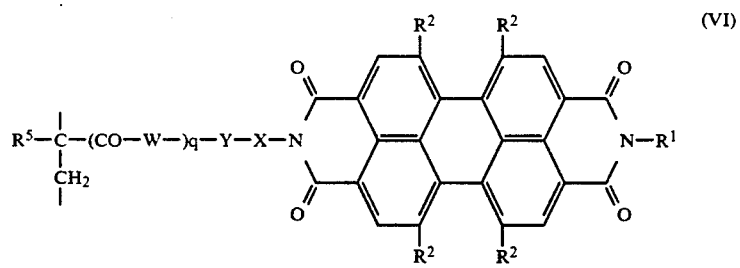

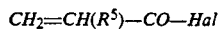

where $R^1$ is $C_1$-$C_{20}$-alkyl, which may be interrupted by one or more oxygen atoms or is phenyl which is monosubstituted or polysubstituted by $C_1$-$C_{13}$-alkyl or $C_1$-$C_{13}$-alkoxy, $R^2$ is identical or different at each of its appearances, each appearance of $R^2$ being independently of the others hydrogen, chlorine, phenoxy or halogen-, $C_1$-$C_4$-alkyl- or $C_1$-$C_4$-alkoxy-substituted phenoxy, X is a chemical bond or a radical of the formula

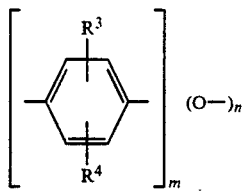

where $R^3$ and $R^4$ are identical or different and each is independently of the other hydrogen, $C_1$-$C_4$-alkyl, $C_1$-$C_4$-alkoxy or halogen, m is 1 or 2 and n is 0 or 1, Y is $C_6$-$C_{24}$-alkylene which may be interrupted by one or more oxygen atoms or by one or more imino or $C_1$-$C_4$-alkylimino groups, and W is oxygen, imino or $C_1$-$C_4$-alkylimino, q is 0 or 1, $R^5$ is hydrogen if q is 0 or hydrogen, methyl or chlorine if q is 1, and M is a mesogenic radical, and the proportion of monomer units of the formula VI is from 0.001 to 40% by weight, based on the weight of the polymer, and the average molecular weight of the polymer is from 2,000 to 100,000.

The present invention further provides perylimide polymers where the characteristic monomer units are radicals of the formulae VIII and IX

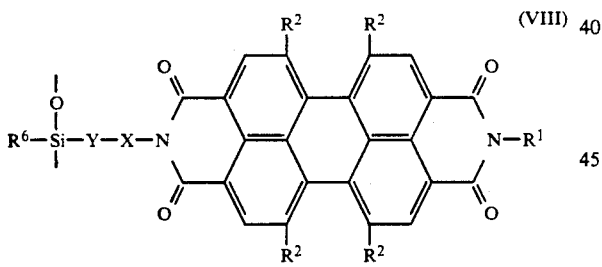

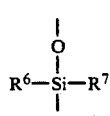

where $R^1$ is $C_1$-$C_{20}$-alkyl, which may be interrupted by one or more oxygen atoms or is phenyl which is monosubstituted or polysubstituted by $C_1$-$C_{13}$-alkyl or $C_1$-$C_{13}$-alkoxy, $R^2$ is identical or different at each of its appearances, each appearance of $R^2$ being independently of the others hydrogen, chlorine, phenoxy or halogen-, $C_1$-$C_4$-alkyl- or $C_1$-$C_4$-alkoxy-substituted phenoxy, X is a chemical bond or a radical of the formula

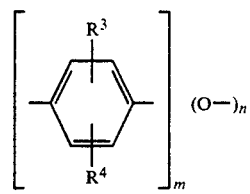

where $R^3$ and $R^4$ are identical or different and each is independently of the other hydrogen, $C_1$-$C_4$-alkyl, $C_1$-$C_4$-alkoxy or halogen, m is 1 or 2 and n is 0 or 1, Y is $C_6$-$C_{24}$-alkylene which may be interrupted by one or more oxygen atoms or by one or more imino or $C_1$-$C_4$-alkylimini groups, and $R^6$ is $C_1$-$C_4$-alkyl or phenyl and $R^7$ is $C_1$-$C_4$-alkyl, phenyl or a radical of the formula Y-M, where Y is as defined above and M is a mesogenic radical, and the proportion of monomer units of the formula VIII is from 0.001 to 40 % by weight, based on the weight of the polymer, and the average molecular weight of the polymer is from 2,000 to 100,000.

As mentioned, the proportion of monomer units of the formula VI or VIII is from 0.001 to 40 % by weight, preferably from 0.01 to 20 % by weight, each percentage being based on the weight of the polymer. The average molecular weight of the polymer is from 2,000 to 100,000, preferably from 5,000 to 20,000. (The average molecular weight is that determined by analytical gel permeation chromatography over PL gel (10, 100, 1,000, 10,000 nm). Tetrahydrofuran was used as mobile phase. Polystyrene standards having polydispersities <1.1 were used for the calibration.)

The mesogenic radicals M in the formula VII or IX are for example the radicals

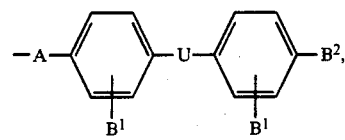

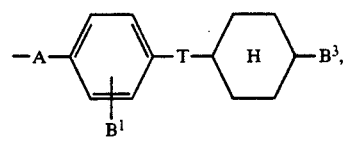

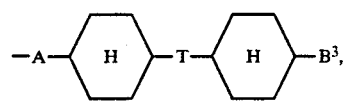

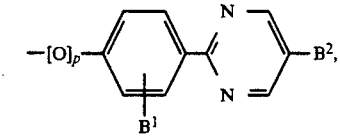

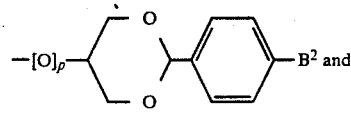

-continued

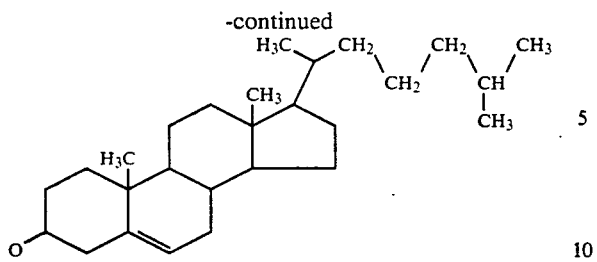

where
A is a chemical bond, oxygen, sulfur or a radical of the formula

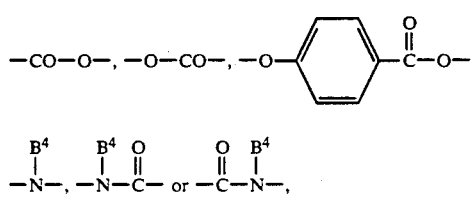

$B^4$ is in each case hydrogen or $C_1$-$C_4$-alkyl,
U is a chemical bond or a radical of the formula
—CO—O—, —O—CO—, —CH=CH—, —CH$_2$—CH$_2$—,

—N=N—,

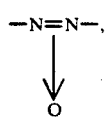

or
T is a chemical bond or a radical of the formula
—CO—O— or —O—CO—,
$B^1$ is hydrogen, methyl, ethyl, methoxy, ethoxy or chlorine,
$B^2$ is hydrogen, unsubstituted or chlorine- or phenyl-substituted $C_1$-$C_{12}$-alkyl, $C_5$-$C_7$-cycloalkyl, unsubstituted or chlorine- or phenyl-substituted $C_1$-$C_1$-alkoxy, $C_4$-$C_{12}$-alkoxycarbonyl, $C_1$-$C_{12}$-alkanoyloxy, fluorine, chlorine, bromine, cyano, 4-cyanophenyl or nitro,
$B^3$ is hydrogen, unsubstituted or chlorine- or phenyl-substituted $C_1$-$C_{12}$-alkyl, unsubstituted or chlorine- or phenyl-substituted $C_1$-$C_{12}$-alkoxy or $C_1$-$C_{12}$-alkoxycarbonyl, and
p is 0 or 1.

Emphasis must be given to perylmide polymers with optically active groups. The optically active group may be present in the radical Y or in the mesogenic radical M, if the latter preferably in the radical $B^2$ or $B^3$.

Individual optically active groups are for example for Y:

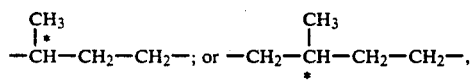

for $B^2$ or $B^3$:

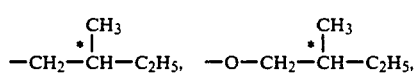

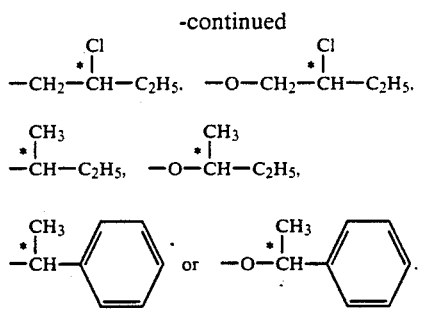

Preference is given to perylimide polymers where the characteristic monomer units are radicals of the above-mentioned formulae VI and VII where
X is a chemical bond,
Y is unbranched $C_6$-$C_{12}$-alkylene,
W is oxygen,
q is 1,
$R^5$ is hydrogen or methyl and
M is a radical of the formula

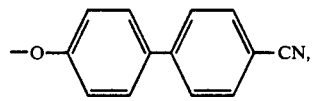

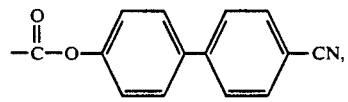

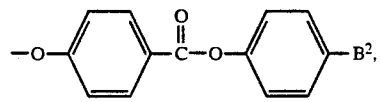

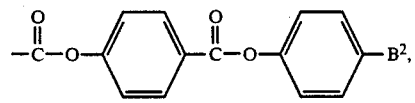

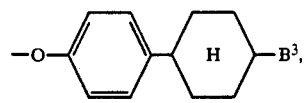

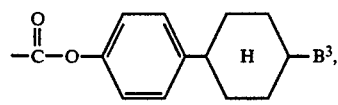

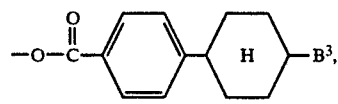

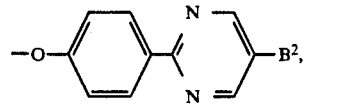

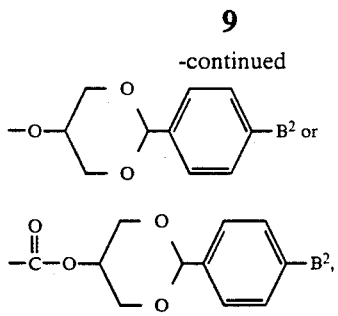

where $B^2$ and $B^3$ are each as defined above. Emphasis must be given in particular to those polymers in which $B^2$ is $C_2$-$C_8$-alkyl, $C_2$-$C_8$-alkoxy, fluorine, chlorine, bromine, cyano, 4-cyanophenyl or nitro and $B^3$ is $C_2$-$C_8$-alkyl.

Preference is further given to perylimide polymers where the characteristic monomer units are radicals of the abovementioned formula VIII and of the formulae X and XI

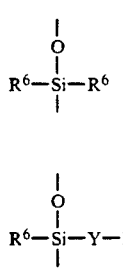

where $R^6$ is in each case $C_1$-$C_4$-alkyl, in particular methyl, and Y and M are each as defined above, although here too particular emphasis must be given to the mesogenic radicals M already characterized as preferred above under the formula VII.

The dye-containing polyacrylates and polymethacrylates are prepared in a conventional manner.

The dye-containing polysiloxanes can be prepared in a polymer-analogous reaction (see for example Makromol. Chem. Rapid Commun. 7 (1986), 71–76).

Further details of the preparation may be found in the Examples.

The novel perylimides of the formula I show excellent light fastness and heat resistance after polymerization. Following copolymerization with mesogenic monomers, the novel dyes have a higher dichroism and are more compatible with the liquid crystalline polymer matrix than existing products. In addition, they offer less resistance to polymerization than the known derivatives.

The dye-containing liquid crystalline copolymers can be used for example as described in Makromol. Chem. 188 (1987) 1355–1366 in electrooptical displays of the guest-host type together with low molecular weight liquid crystals or liquid crystal mixtures, serving as solubilizers for the dye.

Particular emphasis must be given here to their technical use in reversible optical information storage (EP-A-171,045, EP-A-278,446).

Important parameters which must be mentioned here in particular are the high sensitivity of the dye-containing liquid crystalline polymer layer to the writing of information, the high resistance to light and heat of the dyes used for absorbing the laser energy, the very high dichroism of the dye used, which manifests itself in a high signal-to-noise ratio when the information is read out, and the rapid erasure of the information, which requires inter alia a very low viscosity of the heated spot. The dyes according to the present invention meet all these requirements substantially and are notable for excellent stability to light and heat and for a high dichroic ratio. In addition, they exert little if any influence on the viscosity of a liquid crystalline polymer.

The polymerizable dyes according to the present invention additionally have a high fluorescence quantum yield and, following copolymerization with for example methyl methacrylate, methyl acrylate or styrene, can be used as light collector systems. Here they are notable for very good copolymerization properties and high polymer compatibility.

Further advantageous applications in copolymers are for example fluorescent polymers for decorative purposes, fluorescent films for greenhouses or the use as fluorescent pigments.

The Examples which follow illustrate the invention.

EXAMPLE 1

A) Preparation of Monomers 0.72 g of acryloyl chloride was added at room temperature to a mixture of 2.70 g of N-butyl-N'-(6-hydroxyhexyl)-1,6,7,12-tetrachloro-3,4,9,10-perylenebiscarboximide 0.81 g of triethylamine, 0.05 g of hydroquinone and 30 g of dioxane, and the mixture was then heated at the boil for 3 hours. Thereafter 150 ml of water were added in the heat, the mixture was stirred overnight, and the precipitate was filtered off with suction. Washing with hot water and drying left 2.8 g of crude product. It was purified by chromatography over silica gel with 40:1 (v/v) toluene/ethyl acetate as mobile phase and subsequent stirring with n-hexane. This gave 2.2 g of pure dye of the formula:

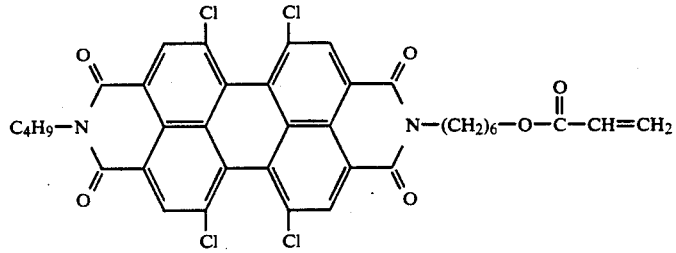

Melting point: 230° C.

| | | |
|---|---|---|
| $C_{37}H_{28}Cl_4N_2O_6$ (738.46) | calculated found | C 60.2 H 3.8 Cl 19.2 N 3.8 O 13.0 C 60.4 H 4.0 Cl 18.9 N 3.6 O 13.2 |

$\lambda_{max}$ (CH$_2$Cl$_2$): 517 nm (38600).

Order parameter S (ZLI 2452 from Merck): 0.75.

The order parameter S was determined in accordance with the known equation $$S = \frac{CR - 1}{CR + 2}$$

in commercial measuring cells having a homogeneously planar edge orientation (polyimide). The dichroic ratio CR was determined by measuring the absorbances A" (measurement with light polarized parallel to the preferred direction of the nematic phase) and A (measurement with light polarized perpendicularly to the preferred direction of the nematic phase) according to the relation CR=A"/A, for which the dye concentration was chosen in such a way that A" was within the range from 1 to 2. The measurements were carried out on a U 3200 spectrophotometer from Hitachi.

EXAMPLE 2

A mixture of 5.70 g of N-butyl-1,6,7,12-tetrachloro-3,4,9,10-perylenebiscarboximide, 2.42 g of 11-bromoundec-1-ene, 1.44 g of potassium carbonate and 50 g of N,N-dimethylformamide was stirred at 100° C. for hours. After cooling the mixture to room temperature, the precipitate formed was filtered off with suction and washed with a little N,N-dimethylformamide and then with water. Drying left 5.7 g of a crude product which was purified by two-fold recrystallization from glacial acetic acid. This gave 3.9 g of pure dye of the formula

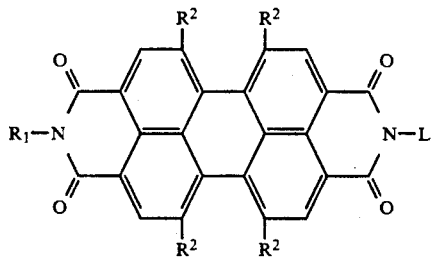

Melting point: 232° C.
$\lambda_{max}$ (CH$_2$Cl$_2$): 517 nm (40200).

EXAMPLE 3

A mixture of 4.20 g of the compound of Example 2, 2.67 g of phenol, 3.94 g of potassium carbonate and 40 g of N-methylpyrrolidone was heated with stirring at 110° C. for 8 hours. After cooling, the precipitate formed was filtered off with suction, washed with a little N-methylpyrrolidone and then with water and dried. The crude dye (4.65 g) was purified by chromatography over silica gel using methylene chloride as mobile phase and subsequent stirring with diethyl ether This produced 3.2 g of pure dye of the formula

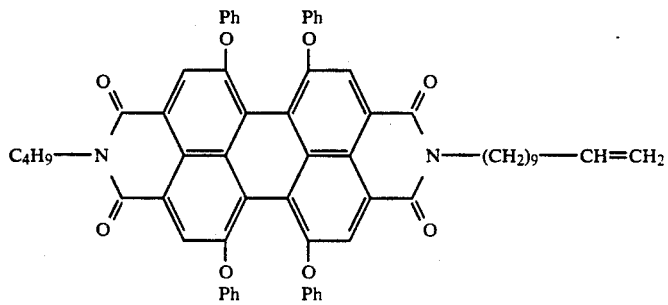

Melting point: 285° C.

| C$_{63}$H$_{54}$N$_2$O$_8$ (967.14) | calculated | C 78.24  H 5.63  N 2.90  O 13.23 |
|---|---|---|
|  | found | C 77.9  H 5.9  N 2.8  O 13.0 |

$\lambda_{max}$ (CH$_2$Cl$_2$): 572 nm (44600).

The perylimides of the formula

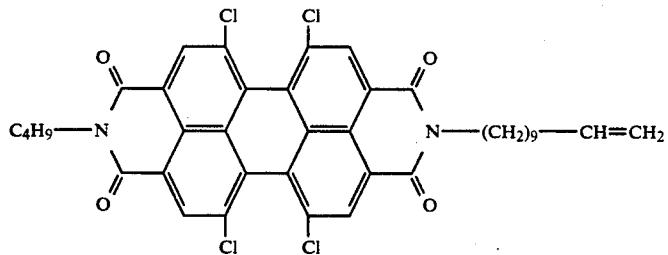

listed below in Table 1 were obtained in a similar manner.

TABLE 1

| Ex. No. | R$^1$ | R$^2$ | L |
|---|---|---|---|
| 4 | —C$_4$H$_9$ | —Cl | —⟨C$_6$H$_4$⟩—O—(CH$_2$)$_9$—CH=CH$_2$ |

TABLE 1-continued

| Ex. No. | R¹ | R² | L |
|---|---|---|---|
| 5 | —C₄H₉ | —O—⌬ | —⌬—O—(CH₂)₉—CH=CH₂ |
| 6 | 2,6-di(CH(CH₃)₂)phenyl | —Cl | —⌬—O—(CH₂)₁₁—O—C(=O)—C(CH₃)=CH₂ |
| 7 | 2,6-di(CH(CH₃)₂)phenyl | —O—⌬ | —⌬—O—(CH₂)₁₁—O—C(=O)—C(CH₃)=CH₂ |
| 8 | —CH₂—CH(C₂H₅)(C₄H₉) | —Cl | —(CH₂)₁₁—O—C(=O)—CH=CH₂ |
| 9 | —CH₂—CH(C₂H₅)(C₄H₉) | —O—⌬ | —(CH₂)₁₁—O—C(=O)—CH=CH₂ |

B) Preparation of Polymers

General Method for Preparing Polyacrylates

In a Schlenk vessel, a monomer solution consisting of 10% by weight of a mixture of a dye monomer and a mesogenic monomer in absolute dioxane is admixed with 1 mol % of azobisisobutyronitrile. After nitrogen has been passed through for 10 minutes, the monomer solution is thermostabilized at 70° C. After the polymerization has ended, the polymers are separated from the monomers by exclusion chromatography using the system Merkogel ®6000/tetrahydrofuran (from Merck, Darmstadt). After the tetrahydrofuran has been removed, the polymer is dried under highly reduced pressure. The quantitative composition of the copolymer is determined by UV spectroscopy and elemental analysis. The phase transition temperatures are determined by differential scanning calorimetry. The liquid crystalline phases are assigned with reference to the textures which appear in the polarizing microscope equipped with a hot stage. Table 2 below shows polymers of the formula

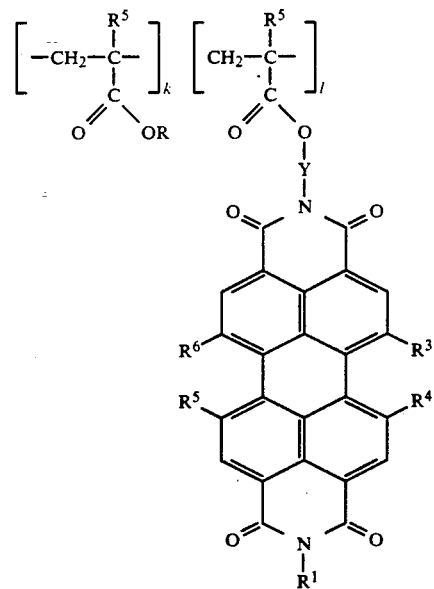

prepared by the above method. (The indices k and l are each weight percentages of the particular monomer units, based on the weight of the polymer.)

TABLE 2

| Ex. No. | k | l | R | R⁵ | R² | R¹ | Y |
|---|---|---|---|---|---|---|---|
| 10 | 99,994 | 0,006 | —CH₃ | H | Cl | —C₄H₉ | —(CH₂)₆— |
| 11 | 99,4 | 0,6 | —CH₃ | H | Cl | —C₄H₉ | —(CH₂)₆— |
| 12 | 99,0 | 1,0 | —CH₃ | H | Cl | —C₄H₉ | —(CH₂)₆— |
| 13 | 90,0 | 10,0 | —CH₃ | H | Cl | —C₂H₉ | —(CH₂)₆— |
| 14 | 99,0 | 1,0 | —CH₃ | —CH₃ | Cl | —C₄H₉ | —(CH₂)₆— |
| 15 | 99,0 | 1,0 | —CH₃ | —Cl | Cl | —C₄H₉ | —(CH₂)₆— |

TABLE 2-continued

| Ex. No. | k | l | R | R⁵ | R² | R¹ | Y |
|---|---|---|---|---|---|---|---|
| 16 | 99,0 | 1,0 | —CH₃ | H | —OPh | —C₄H₉ | —(CH₂)₆— |
| 17 | 99,994 | 0,006 | 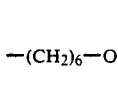 | H | Cl | —C₄H₉ | —(CH₂)₆— |
| 18 | 99,4 | 0,6 | 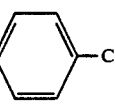 | H | Cl | —C₄H₉ | —(CH₂)₆— |
| 19 | 99,0 | 1,0 | 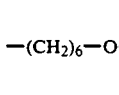 | H | Cl | —C₄H₉ | —(CH₂)₆— |
| 20 | 90 | 10 | 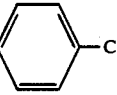 | H | Cl | —C₄H₉ | —(CH₂)₆— |
| 21 | 70 | 30 | 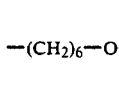 | H | Cl | —C₄H₉ | —(CH₂)₆— |
| 22 | 99,994 | 0,006 | 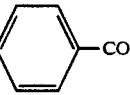 | H | Cl | —C₄H₉ | —(CH₂)₆— |
| 23 | 99 | 1 | 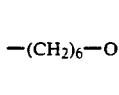 | H | Cl | —C₄H₉ | —(CH₂)₆— |
| 24 | 90 | 10 | 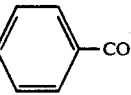 | H | Cl | —C₄H₉ | —(CH₂)₆— |
| 25 | 99 | 1 | 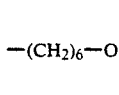 | H | —OPh | —C₄H₉ | —(CH₂)₆— |

Polymer dyes 10 to 25 were prepared by the general method in dioxane by varying the proportion of monomeric perylimide. The novel polymer dyes 17 to 25 form liquid crystalline textures on heating in the hot stage of the polarizing microscope.

Table 3 shows the phase transitions of compounds 12 to 25, combining the results of the differential scanning calorimetry work and the studies under the polarizing microscope (g: glassy; s: smectic; n: nematic; i: isotropic).

TABLE 3

| Example | Phase transition (°C.) |
|---|---|
| 17 | g 29 n 123 i |
| 18 | g 29 n 124 i |
| 19 | g 31 n 124 i |
| 20 | g 38 n 120 i |
| 21 | g 42 n 120 i |
| 22 | g 28 s 92 n 117 i |
| 23 | g 29 s 90 n 115 i |
| 24 | g 34 s 90 n 112 i |

TABLE 3-continued

| Example | Phase transition (°C.) |
|---|---|
| 25 | g 30 s 92 n 115 i |

The liquid crystalline dyes are macroscopically orientable between surface treated glass plates. Measurements of the order parameter indicate a value of 0.60 for the dye of Example No. 18 (nematic glass) and of 0.78 for the dye of Example No. 23 (smectic glass). Synthesis of polysiloxanes

EXAMPLE 26

0.32 ml of a polysiloxane of the formula

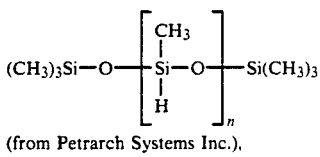

(from Petrarch Systems Inc.), 2.5 g of the mesogen of the formula

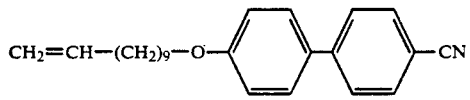

and 0.74 g of the dye of Example 2 were dissolved in 100 ml of absolute toluene under argon in a Schlenk vessel. 0.8 mg of hexachloroplatinic acid was then added. The mixture was stirred at 60° C. for 2 days, the solution was then discharged onto methanol, and the precipitated polymer was filtered off with suction. The crude polymer was dissolved in tetrahydrofuran, and the solution was filtered and discharged again onto methanol with precipitation. This operation was repeated 3 times. Drying at 100° C. under highly reduced pressure left 1.4 g of polymer which on average contains 35 moieties (mesogen and fluorescent dye in a ratio of 9:1) attached to the polymer main chain.

Chlorine content : 3%.
$\overline{M}n$: 9016.
Phase behavior: g 16° C. s 146° C. I.

We claim:
1. A perylimide of the formula

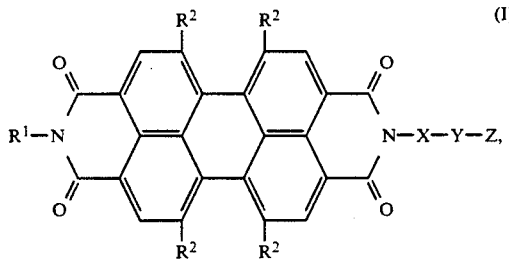

where
R$^1$ is C$_1$-C$_{20}$-alkyl, which may be interrupted by one or more oxygen atoms, or is phenyl which is monosubstituted or polysubstituted by C$_1$-C$_{13}$-alkyl or C$_1$-C$_{13}$-alkoxy, R$^2$ is identical or different at each of its appearances, each appearance of R$^2$ being independently of the others hydrogen, chlorine, phenoxy or halogen-, C$_1$-C$_4$-alkyl- or C$_1$-C$_4$-alkoxy-substituted phenoxy, X is a chemical bond or a radical of the formula

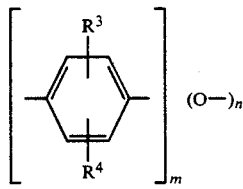

where R$^3$ and R$^4$ are identical or different and each is independently of the other hydrogen, C$_1$-C$_4$-alkyl, C$_1$-C$_4$-alkoxy or halogen, m is 1 or 2 and n is 0 or 1, Y is C$_8$-C$_{24}$-alkylene, and Z is vinyl or a radical of the formula W—CO—C(R$^5$)=CH$_2$, where R$^5$ is hydrogen, methyl or chlorine and W is oxygen, imino or C$_1$-C$_4$-alkylimino.

2. A perylimide as claimed in claim 1, wherein
R$^1$ is C$_1$-C$_{10}$-alkyl or C$_1$-C$_4$-alkyl- or C$_1$-C$_4$-alkoxy-monosubstituted, -disubstituted or -trisubstituted phenyl, R$^2$ is at each appearance independently of the other appearances hydrogen, phenoxy or chlorine, X is a chemical bond, phenylene or phenyleneoxy, Y is C$_6$-C$_{13}$-alkylene, and Z is vinyl or a radical of the formula—O—CO—C(R$^5$)=CH$_2$, where R$^5$ is hydrogen or methyl.

3. The perylimide of claim 1, wherein Y is C$_6$-C$_{24}$-alkylene which is interrupted by one or more oxygen atoms or by one or more imino or C$_1$-C$_4$-alkylimino groups.

* * * * *